(12) United States Patent
Tada et al.

(10) Patent No.: US 6,791,534 B2
(45) Date of Patent: Sep. 14, 2004

(54) TRACKBALL UNITS

(75) Inventors: Yoshihiro Tada, Nishinomiya (JP); Katsuhisa Yamamoto, Nishinomiya (JP); Masahiro Yokoyama, Nishinomiya (JP)

(73) Assignee: Furuno Electric Company, Limited, Nishinomiya (JP)

(*) Notice: Subject to any disclaimer, the term of this patent is extended or adjusted under 35 U.S.C. 154(b) by 282 days.

(21) Appl. No.: 10/067,855

(22) Filed: Feb. 8, 2002

(65) Prior Publication Data

US 2002/0109674 A1 Aug. 15, 2002

(30) Foreign Application Priority Data

Feb. 9, 2001 (JP) ....................................... 2001-034316

(51) Int. Cl.[7] .............................................. G09G 5/00
(52) U.S. Cl. ...................................... 345/167; 345/156
(58) Field of Search ................................ 345/156, 163, 345/164, 167; 340/706, 709

(56) References Cited

U.S. PATENT DOCUMENTS

| | | | | |
|---|---|---|---|---|
| 5,214,415 A | * | 5/1993 | Pandolei | 345/164 |
| 5,486,845 A | * | 1/1996 | Chait | 345/163 |
| 6,496,181 B1 | * | 12/2002 | Bomer et al. | 345/167 |

FOREIGN PATENT DOCUMENTS

| | | |
|---|---|---|
| GB | 2220466 | 1/1990 |
| JP | 3-156520 | 7/1991 |
| JP | 03/156520 | * 7/1991 |

OTHER PUBLICATIONS

Keyton Computer (Products) [online], 2000, retrieved Mar. 7, 2002, product description retrieved from internet:<http://www/keyton.co.jp/prodcuts/UEVE/G101PMN,htm>.

Evergreen Systems [online], Evergreen System copyright 1995–2000, retrieved on Mar. 7, 2002, product description retrieved from internet: <http://www.trackballs.com/nema_tb.htm>.

Evergreen Systems [online], Evergreen System copyright 1995–2000, retrieved on Mar. 7, 2002, product description retrieved from internet: <http://www.trackballs.com/xx/htm>; for date of publication see: http://www.trackballs.com/desktop.htm.

* cited by examiner

Primary Examiner—Vijay Shankar
Assistant Examiner—Nitin Patel
(74) Attorney, Agent, or Firm—Birch, Stewart, Kolasch & Birch, LLP

(57) ABSTRACT

The invention provides a trackball unit featuring good water resistance and user maintenance capabilities. A case (3) of the trackball unit has a drain pipe (32) connecting a cavity (33) formed inside the case (3) for accommodating a ball (2) to the exterior of the case (3). A case cover (6) has a ring-shaped projecting part (62) while a ball cover (7) has a pair of locking tabs (72, 73) which engage with the projecting part (62) of the case cover (6), so that the ball cover (7) can be detachably fitted to the case cover (6).

4 Claims, 15 Drawing Sheets

TRACKBALL UNITS

BACKGROUND OF THE INVENTION AND RELATED ART STATEMENT

The present invention relates to trackball units installed on operating panels of various kinds of equipment.

Various types of pointing devices are known in the prior art, such as trackballs and trackpads that are used for moving a cursor on a display screen. One advantage of these pointing devices is the significant ease of their operation. The pointing devices are therefore installed on operating panels of various kinds of equipment, such as computers, and used for moving the cursor on the display screen.

Since the equipment like a computer provided with a pointing device is usually used indoors, water seldom intrudes into a trackball unit incorporating a trackball. Therefore, electronic devices like photocouplers for detecting rotation of a ball do not fail due to water ingress into the equipment through the trackball unit, except in rare circumstances. For this reason, almost no consideration is given to water-resistant properties of the trackball unit in designing its structure.

Since commercially available trackball units are designed with little consideration to water resistance, it is normally impossible to employ them as a pointing device for moving a cursor on equipment to be installed on an open deck of a pleasure boat, for example.

Another problem of the trackball unit is that if any foreign matter, such as dust, enters the trackball unit, it is necessary to remove the foreign matter because it impedes smooth rotation of the ball. It is desirable that a user can easily remove the foreign matter in such cases. It is obvious that the capability of such user maintenance would enhance the convenience of the trackball.

SUMMARY OF THE INVENTION

In the light of the foregoing, it is an object of the invention to provide a trackball unit featuring good water resistance and user maintenance capabilities.

To achieve this object, a trackball unit of the invention for moving a cursor on a display screen comprises a spherical ball and a casing having a ball receptacle for accommodating the ball and a drain hole connecting the ball receptacle to the exterior of the casing.

As the casing has a drain hole connecting the ball receptacle to the exterior of the casing, water which has intruded into the trackball unit can be drained to its exterior through the drain hole. In this construction, even if water leaks into the trackball unit, it would not further intrude into equipment on which the trackball unit is installed through a gap made at a shaft mounting point of the trackball unit, for instance. Accordingly, photoelectric detectors and various other electronic components provided in the trackball unit and in the equipment are hardly exposed to water dripping or seepage or other form of water leakage. This provides enhanced water resistance and serves to prevent failures of the internal electronic components of the trackball unit and the equipment potentially caused by exposure to water.

In one aspect of the invention, the trackball unit further comprises a cover attached to the casing, wherein the cover has a generally circular hole in the center and is detachably fitted to the casing.

This construction allows user maintenance of the trackball unit, enabling a user to easily remove foreign matter, such as dust, which has entered the trackball unit.

In another aspect of the invention, the trackball unit further comprises a ring-shaped ball retainer placed between the cover and the ball, the ball retainer having elasticity.

The elastic ball retainer serves to hold the ball at a stable position inside the casing, so that it is possible to rotate the ball in a stable fashion even when the trackball unit is installed on a vertical surface, for example. Accordingly, the trackball unit of the invention ensures excellent operability one would normally expect from a trackball regardless of where the trackball unit is installed.

In still another aspect of the invention, the trackball unit further comprises a pipe connected to the drain hole.

This construction makes it possible to easily drain water which has intruded into the trackball unit to the exterior of the equipment on which the trackball unit is installed without adversely affecting internal components of the equipment.

These and other objects, features and advantages of the invention will become more apparent upon reading the following detailed description in conjunction with the accompanying drawings.

DESCRIPTION OF THE PREFERRED EMBODIMENTS OF THE INVENTION

Figure 1:
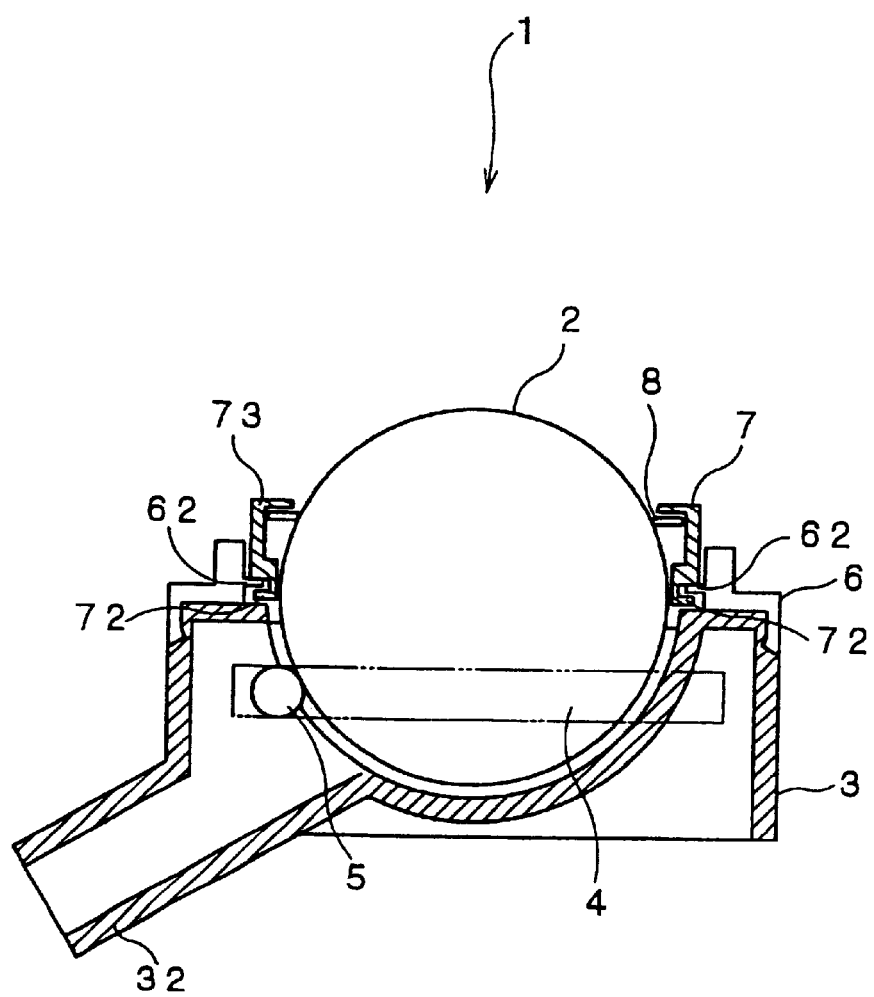
FIG. 1 is a cross-sectional side view of a trackball unit according to a preferred embodiment of the invention.
Figure 2:
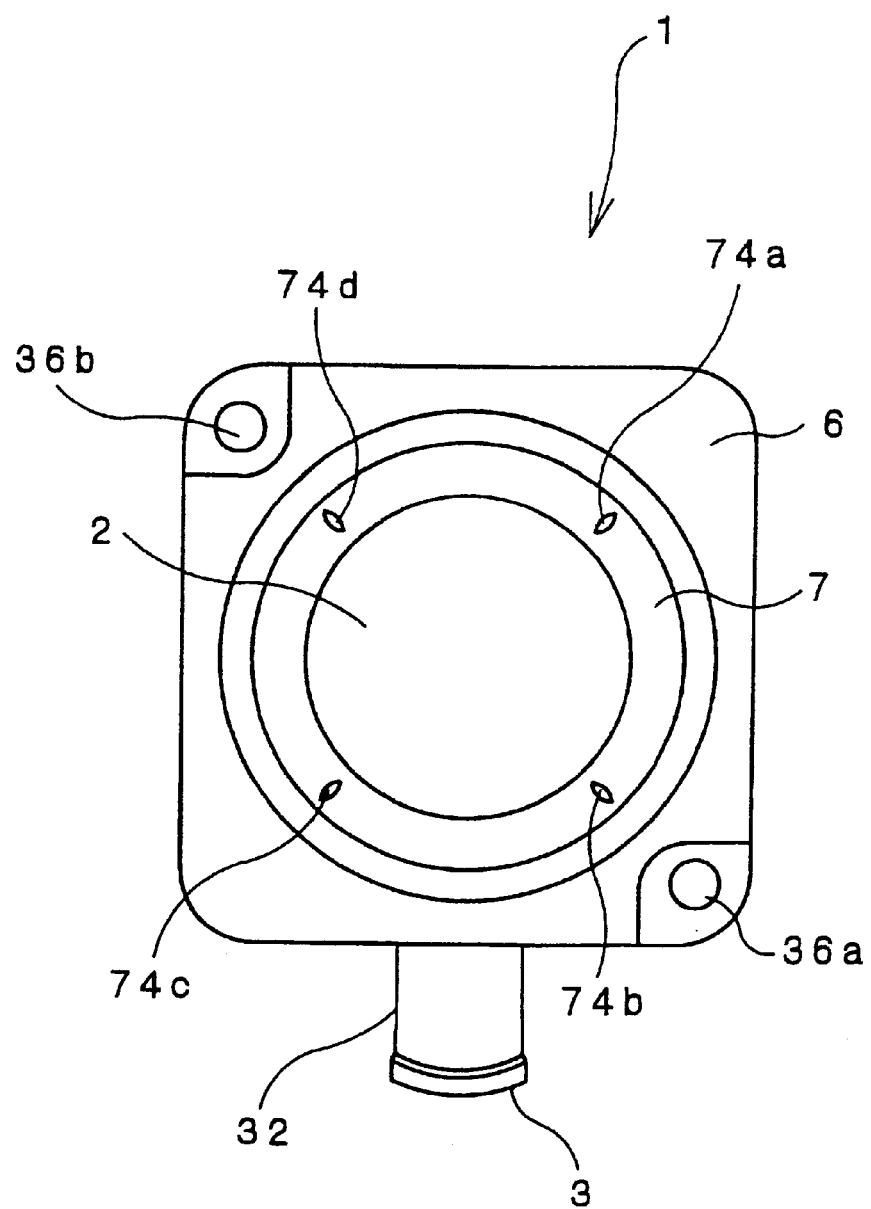
FIG. 2 is a top view of the trackball unit shown in FIG. 1.
Figure 3:
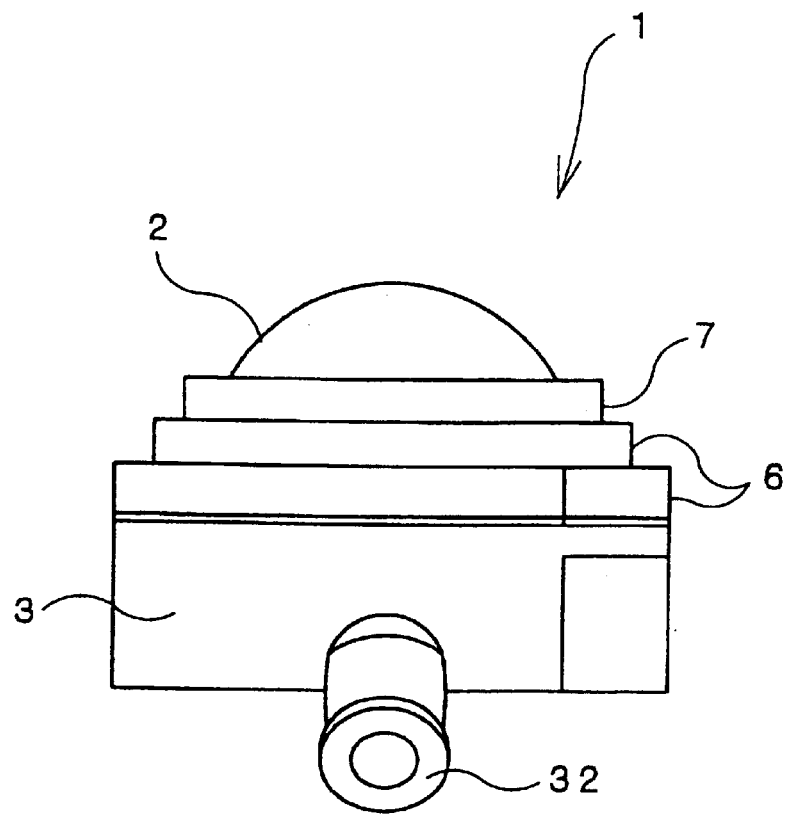
FIG. 3 is an elevational view of the trackball unit of FIG. 1.
Figure 4:
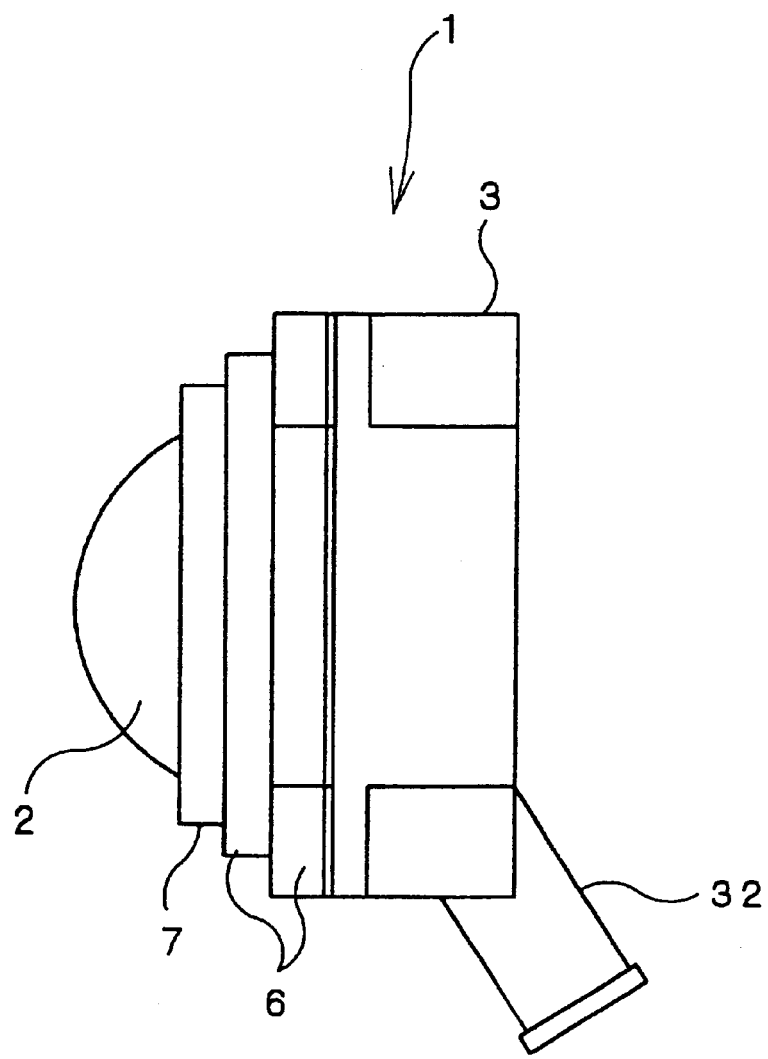
FIG. 4 is a side view of the trackball unit shown in FIG. 1.
Figure 5:
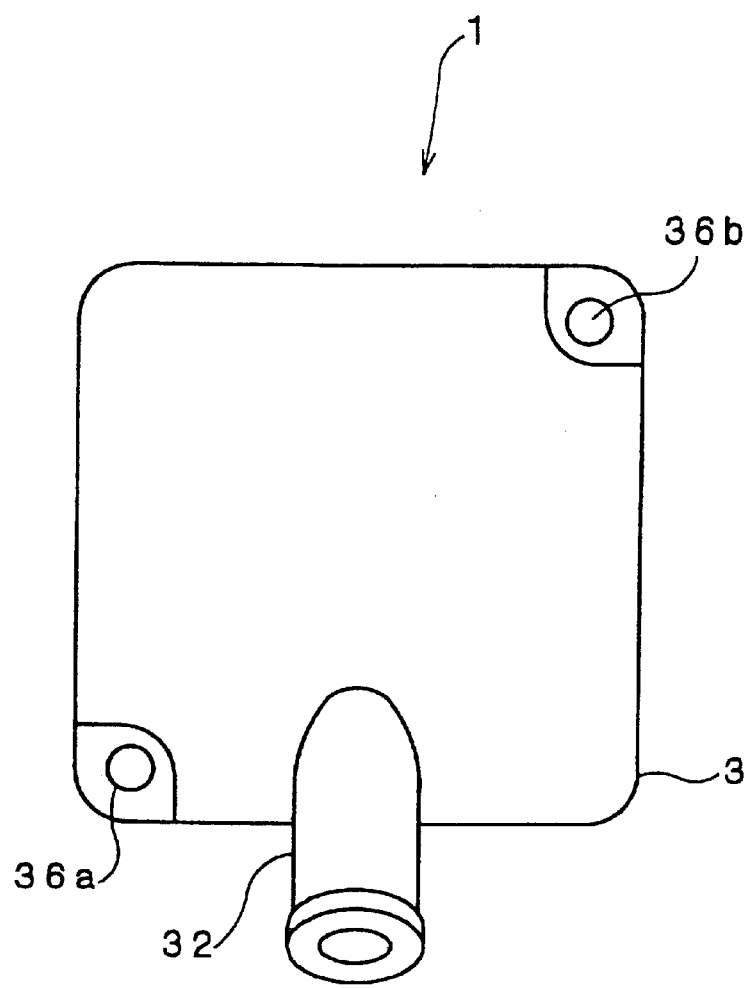
FIG. 5 is a bottom view of the trackball unit shown in FIG. 1.
Figure 6:
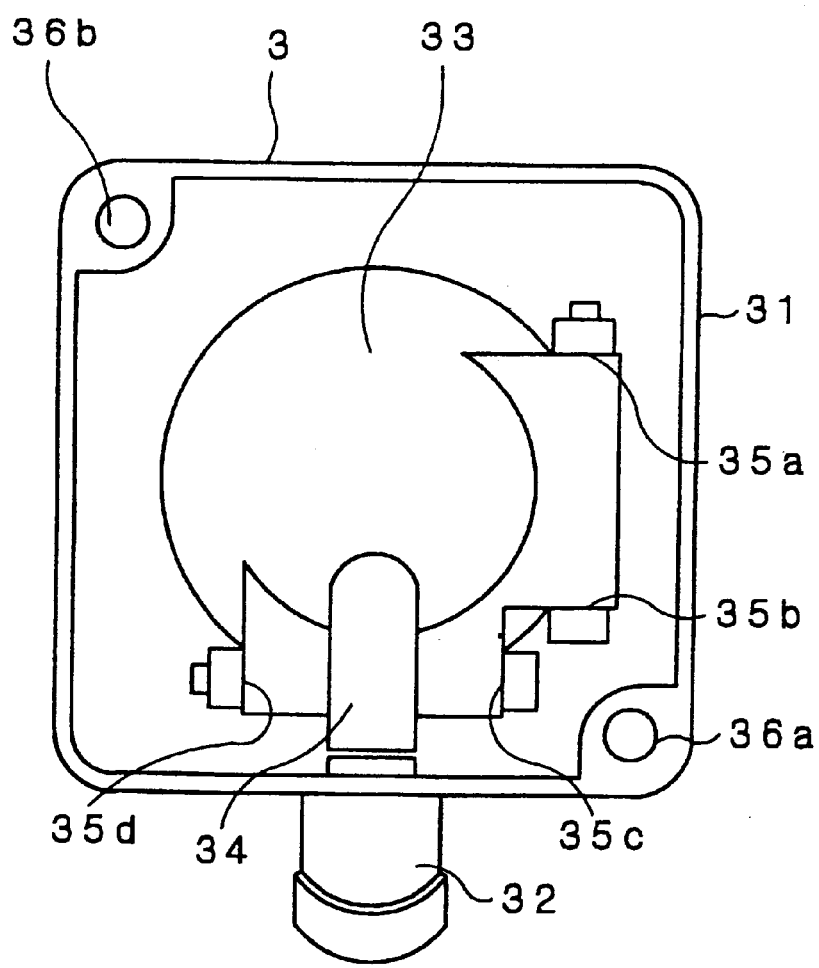
FIG. 6 is a top view of a case of the trackball unit shown in FIG. 1.
Figure 7:
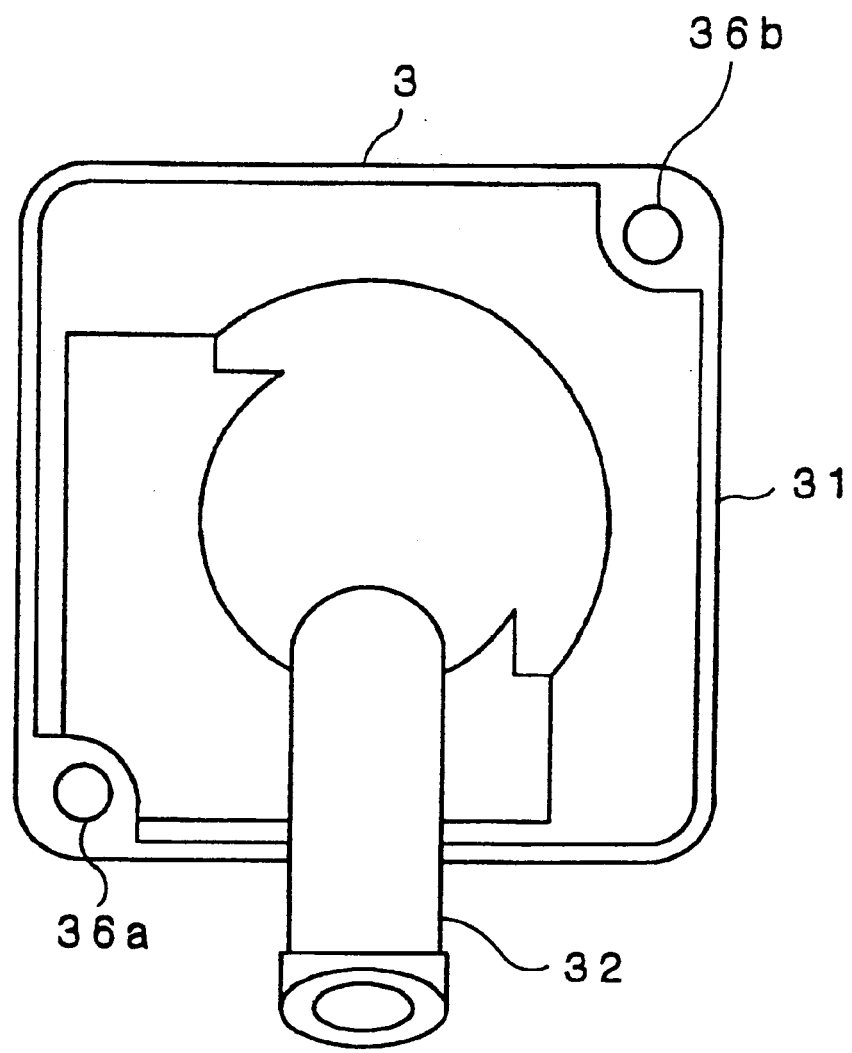
FIG. 7 is a bottom view of the case of the trackball unit shown in FIG. 1.
Figure 8:
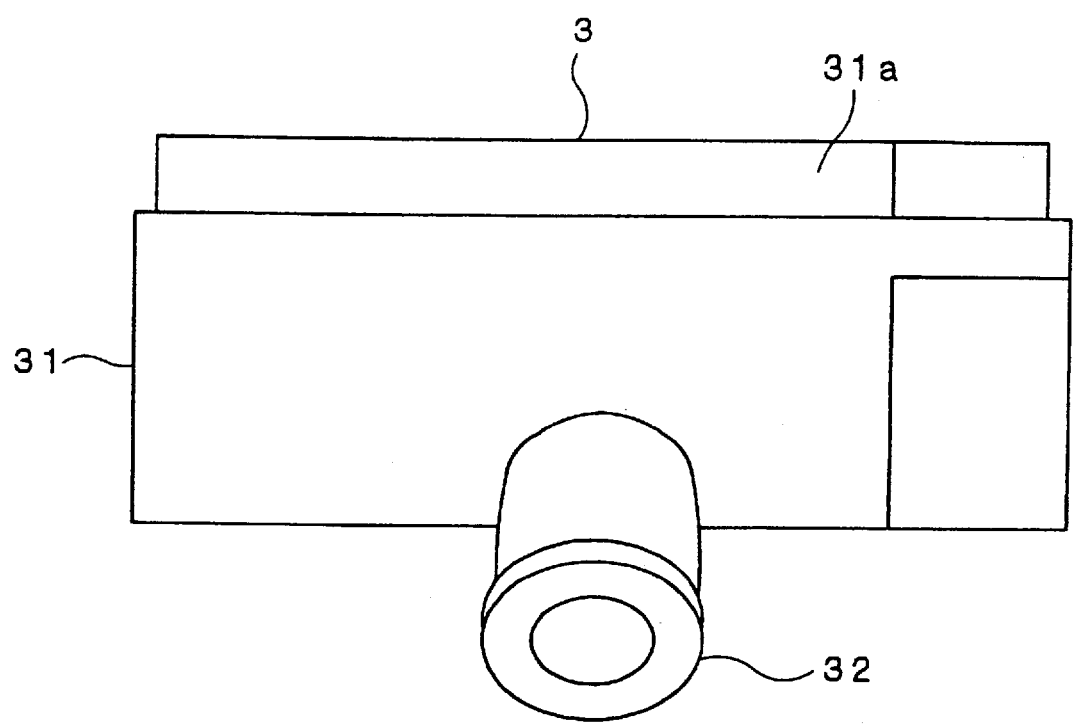
FIG. 8 is an elevational view of the case of the trackball unit shown in FIG. 1.
Figure 9:
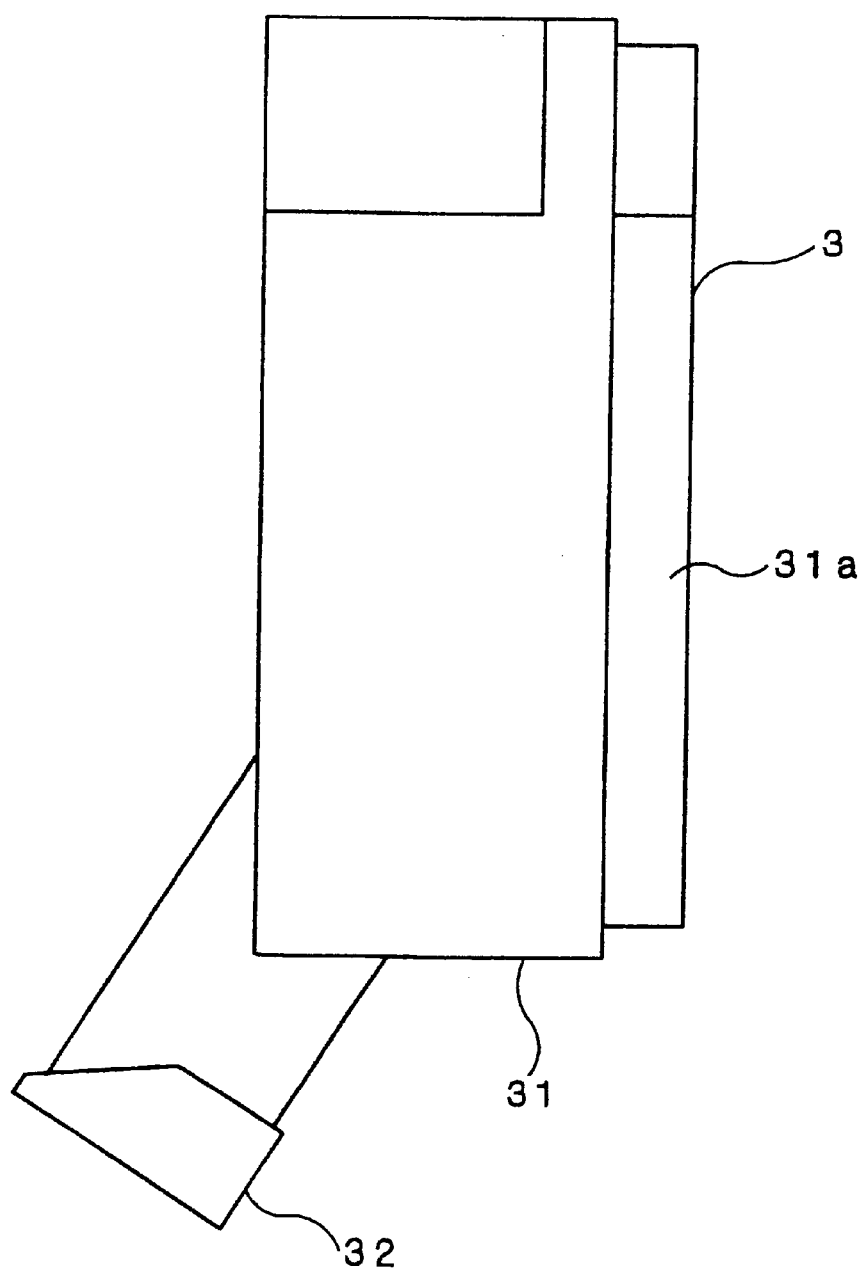
FIG. 9 is a side view of the case of the trackball unit shown in FIG. 1.

A preferred embodiment of the invention is now described in detail with reference to the accompanying drawings.

Referring to FIGS. 1 to 5, a trackball unit 1 of the preferred embodiment comprises a ball 2, a case 3 housing the ball 2, a pair of shafts 4, 5 mounted in the case 3, a case cover 6 affixed to the case 3, a ball cover 7 detachably affixed to the case cover 6 and a ball retainer 8 fitted inside the ball cover 7. A user operates the ball 2 for moving a cursor displayed on a display screen.

The case 3 includes a case body 31 having generally a square shape in top view and a cylindrical drain pipe 32 extending obliquely downward for removing water as shown in FIGS. 6 to 9.

The case body 31 has a generally square-shaped frame portion 31a which almost fits into a frame portion 64 of a later-described case cover body 61 of the case cover 6 and a hemispherical cavity 33 in which the ball 2 is almost accommodated. At a point near the bottom of the cavity 33 in the case body 31, there is formed a drain hole 34 extending obliquely downward and connecting to the drain pipe 32. The drain pipe 32 and the drain hole 34 together work to draw off water which has intruded into the trackball unit 1 to the exterior of equipment. There are formed two pairs of holes 35a–35b, 35c–35d for fitting the shafts 4, 5 in the cavity 33 in the case body 31 at locations higher than the drain hole 34, the line connecting the holes 35a and 35b being perpendicular to the line connecting the holes 35c and 35d. There are further formed a pair of holes 36a, 36b in the case body 31 near its two diagonally opposite corners. These holes 36a, 36b are used for fixing the trackball unit 1 to the equipment.

Ends of the shaft 4 are inserted into shaft bearings (not shown) fitted in the holes 35a, 35b formed in the case 3 and ends of the shaft 5 are inserted into shaft bearings (not shown) fitted in the holes 35c, 35d formed in the case 3. When the ball 2 is rotated, the two shafts 4, 5 which are held in contact with the ball 2 rotate about their own axes which intersect each other at right angles. Although not illustrated, an encoding wheel is attached to one end of each shaft 4, 5, the encoding wheel being located between a light source and a photoelectric detector. As the encoding wheel rotates, the photoelectric detector receives light pulses passing through the encoding wheel and produces an electric pulse train indicating the moving distance and direction of the cursor. It is preferable that the shaft bearings be made of such material as polyacetal to avoid corrosion and water ingress into the equipment through the trackball unit 1.

Figure 10:
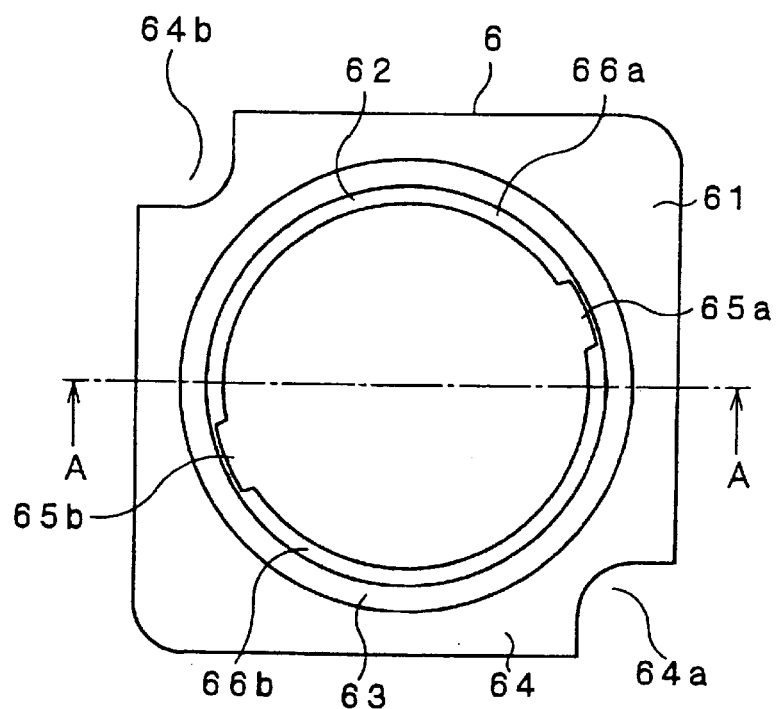
FIG. 10 is a top view of a case cover of the trackball unit shown in FIG. 1.
Figure 11:
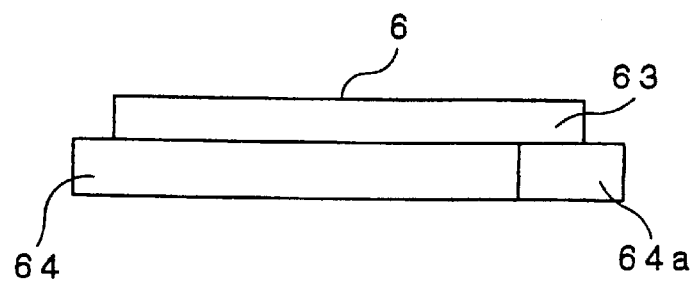
FIG. 11 is an elevational view of the case cover of the trackball unit shown in FIG. 1.
Figure 12:
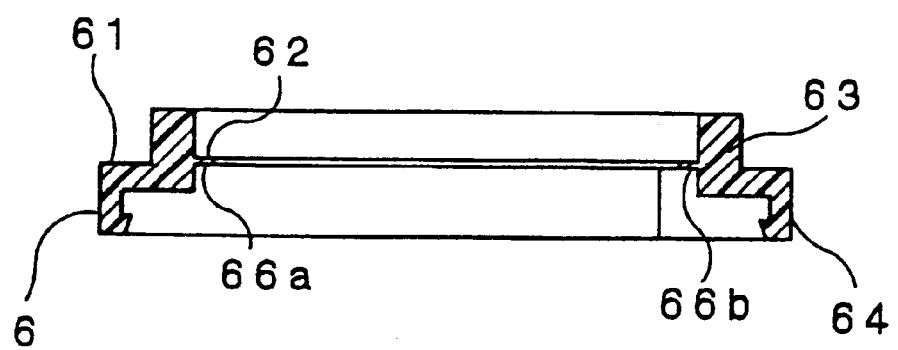
FIG. 12 is a cross-sectional view of the case cover of the trackball unit taken along lines A—A of FIG. 10.
Figure 13:
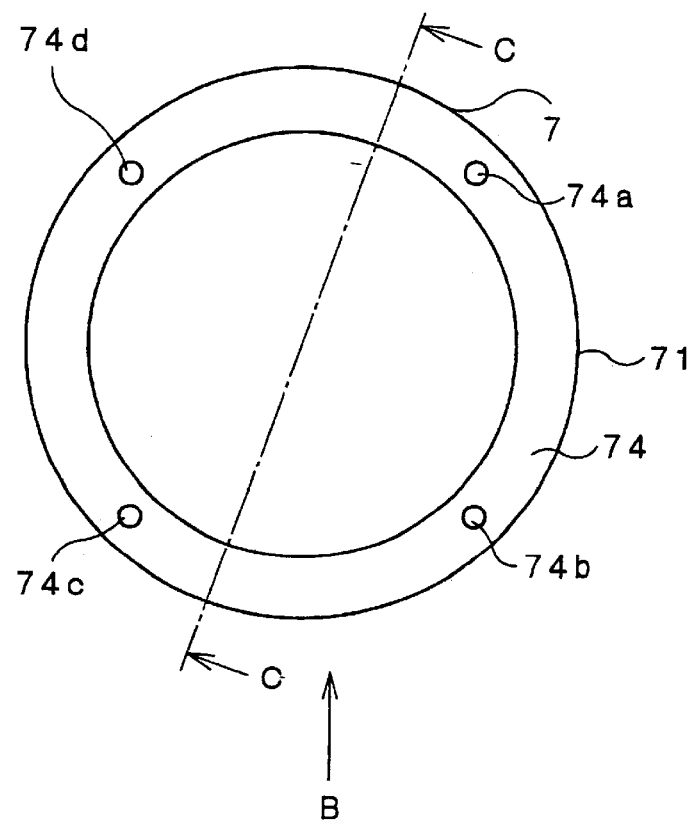
FIG. 13 is a top view of a ball cover of the trackball unit shown in FIG. 1.
Figure 14:
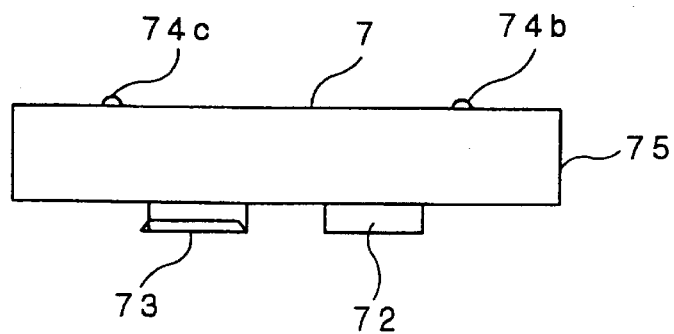
FIG. 14 is a side view of the ball cover as viewed in the direction B shown in FIG. 13.
Figure 15:
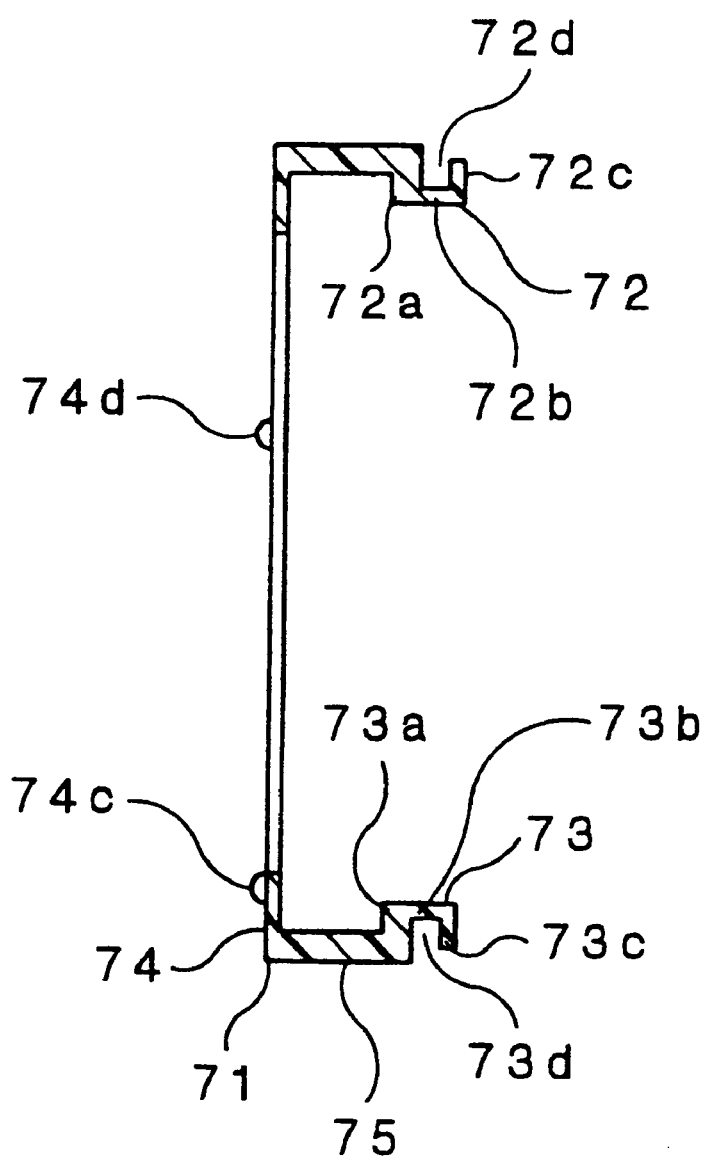
FIG. 15 is a cross-sectional view of the ball cover taken along lines C—C of FIG. 13.
Figure 16:
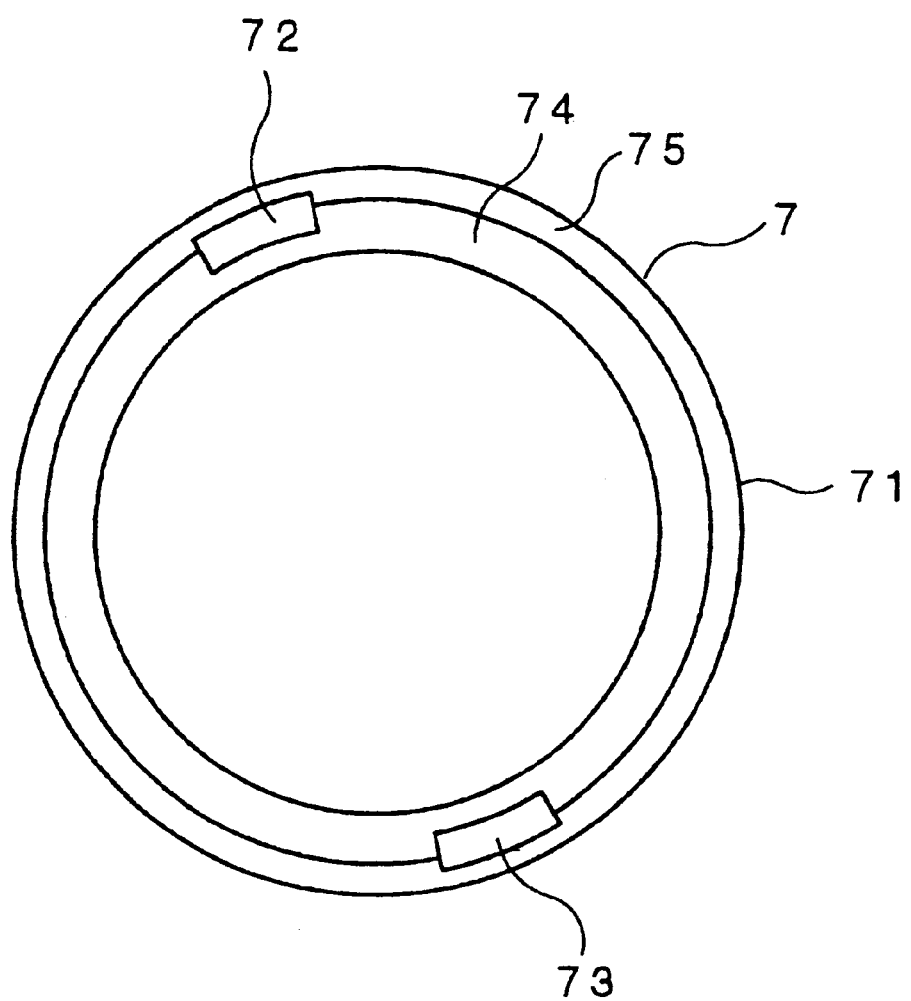
FIG. 16 is a bottom view of the ball cover of the trackball unit shown in FIG. 1.

The case 3 and the case cover 6 together constitute an enclosure for accommodating the ball 2. As depicted in FIGS. 10 to 12, the case cover 6 has the aforementioned case cover body 61 and a generally ring-shaped projecting part 62 which juts out inward from the case cover body 61 and meshes with later-described two locking tabs 72, 73 formed on the ball cover 7. The case cover body 61 has a cylindrical frame portion 63 and a generally rectangular frame portion 64, the frame portion 63 and the frame portion 64 together forming a single structure. At two diagonally opposite corners of the rectangular frame portion 64, there are formed recesses 64a, 64b as illustrated.

Two cutouts 65a, 65b are formed in the projecting part 62 which is formed on an inner cylindrical surface of the frame portion 63 of the case cover body 61. These cutouts 65a, 65b allow the locking tabs 72, 73 of the ball cover 7 to pass through when fitting or removing the ball cover 7. Of the entire projecting part 62, locking portions 66a, 66b excluding areas of the cutouts 65a, 65b engage with the locking tabs 72, 73 of the ball cover 7.

When assembling the trackball unit 1, the case cover 6 is fitted to the case 3 such a manner that the two corners of the frame portion 64 of the case cover 6 where the recesses 64a, 64b are formed are positioned to face the two corners of the case 3 where the holes 36a, 36b are made and the frame portion 31a of the case body 31 of the case 3 fits in the rectangular frame portion 64 of the case cover 6.

The ball cover 7 has a ball cover body 71 and the aforementioned two locking tabs 72, 73 which jut out from the ball cover body 71 and mesh with the projecting part 62 as shown in FIGS. 13 to 16.

The ball cover body 71 is formed of a ring-shaped cover portion 74 and a cylindrical frame portion 75 extending downward from the outer periphery of the cover portion 74, the cover portion 74 and the frame portion 75 together forming a single structure. Further, there are formed four projections 74a, 74b, 74c, 74d on the top surface of the cover portion 74 of the ball cover body 71. These projections 74a, 74b, 74c, 74d serve to indicate the correct position of the ball cover 7 in relation to the case cover 6 when attaching and removing the ball cover 7 to and from the case cover 6.

The locking tab 72 has a root portion 72a whose one end is affixed to the frame portion 75 of the ball cover body 71, the root portion 72a extending toward the center of the cylindrical frame portion 75, a vertical portion 72b extending downward from the other end of the root portion 72a, and a clamp portion 72c radially extending from a far end of the vertical portion 72b, wherein the root portion 72a, the vertical portion 72b and the clamp portion 72c together constitute a single structure having a generally U-shaped cross section. Similarly, the locking tab 73 has a root portion 73a whose one end is affixed to the frame portion 75 of the ball cover body 71, the root portion 73a extending toward the center of the cylindrical frame portion 75, a vertical portion 73b extending downward from the other end of the root portion 73a, and a clamp portion 73c radially extending from a far end of the vertical portion 73b, wherein the root portion 73a, the vertical portion 73b and the clamp portion 73c together constitute a single structure having a generally U-shaped cross section. Under conditions where the ball cover 7 is already attached to the case cover 6, the locking portions 66a, 66b of the projecting part 62 of the case cover 6 are fitted in grooves 72d, 73d formed in the locking tabs 72, 73, whereby the locking portions 66a, 66b engage with the clamp portions 72c, 73c of the locking tabs 72, 73. The ball retainer 8 which will be described later in detail would not easily come off the ball cover 7 even when the ball cover 7 is removed from the case cover 6, because the root portions 72a, 73a of the locking tabs 72, 73 serve to retain the ball retainer 8 inside the ball cover 7. This means that the root portions 72a, 73a help prevent loss of the ball retainer B when the ball cover 7 is removed for maintenance.

The ball cover 7 is fitted to the case cover 6 in such a way that the cylindrical frame portion 75 of the ball cover body 71 fits into the frame portion 63 of the case cover body 61 of the case cover 6.

Figure 17:
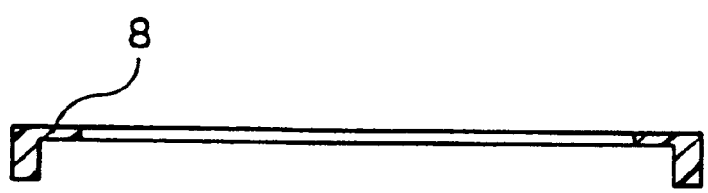
FIG. 17 is a central cross-sectional view of a ball retainer of the trackball unit shown in FIG. 1.

The ball retainer 8 is made of an elastic material and, as shown in FIG. 17, has a cylindrical outer surface whose diameter is approximately equal to the diameter of the inner surface of the cylindrical frame portion 75 of the ball cover 7. When the ball cover 7 is attached to the case cover 6, the ball retainer 8 located between the cover portion 74 of the ball cover 7 and the ball 2 serves to hold the ball 2 at a stable position inside the case 3. Since the ball retainer 8 having elasticity is placed between the ball cover 7 and the ball 2 to hold the ball 2 at a stable position within the case 3 as described above, it is possible to rotate the ball 2 in a stable fashion, even when the trackball unit 1 is installed on a vertical surface, for example. Accordingly, the trackball unit 1 of the present embodiment ensures excellent operability one would normally expect from a trackball regardless of where the trackball unit 1 is installed.

Now, a user maintenance procedure to be followed when foreign matter, such as dust, has entered the trackball unit 1 is described.

First, the user aligns the locking tabs 72, 73 provided on the ball cover 7 with the cutouts 65a, 65b formed in the projecting part 62 of the case cover 6 by turning the ball cover 7, while using the four projections 74a, 74b, 74c, 74d on the ball cover 7 as alignment guide marks. After alignment, the user lifts the ball cover 7 and removes it from the case cover 6.

The user then takes off the ball 2 from the case 3 and removes the foreign matter out of the trackball unit 1. After removing the foreign matter, the user returns the ball 2 back into the cavity 33 in the case 3.

Finally, the user fits the locking tabs 72, 73 of the ball cover 7 in the cutouts 65a, 65b formed in the projecting part 62 of the case cover 6 and turns the ball cover 7. As the locking portions 66a, 66b of the projecting part 62 of the case cover 6 are fitted in the grooves 72d, 73d formed in the locking tabs 72, 73, the locking portions 66a, 66b are secured by the clamp portions 72c, 73c of the locking tabs 72, 73, whereby the ball cover 7 is fixed to the case cover 6.

The user can easily remove the foreign matter which has entered the trackball unit 1 by the aforementioned procedure.

Since the drain pipe 32 and the drain hole 34 provided on the case body 31 of the case 3 together work to draw off water in the embodiment described above, it is possible to drain water which has intruded into the trackball unit 1 to the exterior of the equipment on which the trackball unit 1 is installed. This serves to prevent further intrusion of water from inside the trackball unit 1 into the equipment, providing enhanced water resistance. Therefore, photoelectric detectors and various other electronic components provided in the trackball unit 1 and in the equipment are hardly exposed to water dripping or seepage or other form of water leakage, resulting in the prevention of failures of the electronic components. Since the cavity 33 formed in the case 3 for accommodating the ball 2 has a hemispherical shape water which has leaked into the trackball unit 1 is likely to gather at the bottom of the cavity 33. In the trackball unit 1 of the embodiment, water thus collected at the bottom of the cavity 33 is effectively drained to the exterior of the equipment through the drain hole 34 and the drain pipe 32.

Furthermore, since the ball cover 7 can be removed from and attached to the case cover 6 by simply turning the ball cover 7, the user can easily remove foreign matter which has entered the trackball unit 1. It would be appreciated from the foregoing discussion that the aforementioned structure of the trackball unit 1 provides a good user maintenance capability.

Furthermore, since the ball 2 is held at a stable position within the case 3 with the elastic ball retainer 8 placed between the ball cover 7 and the ball 2, it is possible to rotate the ball 2 in a stable fashion even when the trackball unit 1 is installed on a vertical surface, for example. Accordingly, the trackball unit 1 of the present embodiment ensures excellent operability regardless of where it is installed.

In one varied form of the embodiment, a flexible pipe made of silicone rubber, for instance, may be connected to the drain pipe 32 provided on the case 3 of the trackball unit 1. This variation of the embodiment produces such advantages that the trackball unit 1 can be installed at any desired location, such as on an operating panel of equipment, and water which has intruded into the trackball unit 1 can be easily drained to the exterior of the equipment without adversely affecting internal components of the equipment on which the trackball unit 1 is installed.

While the invention has thus far been described with reference to its preferred embodiment, the invention is not limited thereto but may be practiced in various forms otherwise than as specifically described within the scope of the appended claims. As an example, there may be provided a pair of locking tabs on a case cover jutting out from two locations thereof and a ring-shaped projecting part on a ball cover with a pair of cutouts formed in the projecting part. This alternative structure would also allow the user to easily attach and remove the ball cover to and from the case cover.

What is claimed is:

1. A trackball unit for moving a cursor on a display screen, said trackball unit comprising:
   a spherical ball; and
   a casing having a ball receptacle for accommodating the ball, a drain hole connecting the ball receptacle to the exterior of the casing, and a drain pipe connected to the drain hole, wherein the drain pipe protrudes beyond the exterior of the casing.

2. The trackball unit according to claim 1 further comprising a cover attached to the casing, wherein the cover has a generally circular hole in the center and is detachably fitted to the casing.

3. The trackball unit according to claim 1 or 2 further comprising a ring-shaped ball retainer placed between the cover and the ball, the ball retainer having elasticity.

4. The trackball unit according to claim 1, wherein the drain pipe is removeably coupled to an external pipe for guiding discharged water away from the casing.

* * * * *